(12) United States Patent
Heo et al.

(10) Patent No.: US 9,288,808 B2
(45) Date of Patent: Mar. 15, 2016

(54) METHOD AND APPARATUS FOR POWER SHARING CARRIER SET FOR CARRIER AGGREGATION

(75) Inventors: Youn Hyoung Heo, Suwon (KR); Mo-Han Fong, Sunnyvale, CA (US); Sean McBeath, Irving, TX (US); Zhijun Cai, Euless, TX (US); Mark Earnshaw, Kanata (CA); Hua Xu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 181 days.

(21) Appl. No.: 13/389,788

(22) PCT Filed: Aug. 9, 2010

(86) PCT No.: PCT/US2010/044881
§ 371 (c)(1),
(2), (4) Date: Sep. 21, 2012

(87) PCT Pub. No.: WO2011/019653
PCT Pub. Date: Feb. 17, 2011

(65) Prior Publication Data
US 2013/0121264 A1  May 16, 2013

Related U.S. Application Data

(60) Provisional application No. 61/234,023, filed on Aug. 14, 2009.

(51) Int. Cl.
*H04W 72/04* (2009.01)
*H04W 52/34* (2009.01)
(Continued)

(52) U.S. Cl.
CPC ........ *H04W 72/0473* (2013.01); *H04W 52/346* (2013.01); *H04W 52/367* (2013.01); *H04W 52/54* (2013.01)

(58) Field of Classification Search
CPC .. H04W 52/04; H04W 72/04; H04W 72/0473
See application file for complete search history.

(56) References Cited

U.S. PATENT DOCUMENTS 5,578,971 A * 11/1996 Minami ................ H03F 3/2178
330/10
6,728,224 B1 * 4/2004 Kakizaki ............... H04W 52/52
330/133

(Continued)

FOREIGN PATENT DOCUMENTS

CA       2241278 A1 * 12/1999 ............. H03F 3/602

OTHER PUBLICATIONS

3GPP TR 36.814 V0.4.1 (Feb. 2009), titled "Technical Report 3rd Generation Partnership Project Technical Specification Group Radio Access Network Further Advancements for E-UTRA Physical Layer Aspects(Release 9)", was presented as Technical Report, 3GPP TR 36.814, having Document No. 3GPP TR 36.814 V0.4.1 (Feb. 2009), dated Feb. 2009, p. 1-31.*

(Continued)

*Primary Examiner* — Andrew Lai
*Assistant Examiner* — Hoyet H Andrews
(74) *Attorney, Agent, or Firm* — Fish & Richardson P.C.

(57) ABSTRACT

A method and apparatus for configuring a power sharing carrier set on a user equipment having multiple component carriers, the method receiving an indication from a network that carrier configuration information is supported in a cell of the network; providing at least one of capability information regarding carriers and bands supported by the user equipment and power sharing information the user equipment is capable of supporting; and obtaining configuration information for power sharing carrier sets. Furthermore, a network element for to providing a power sharing carrier set configuration, the network element configured to: send an indication from a network that carrier configuration information is supported in a cell of the network; receive at least one of capability information regarding carriers and bands supported by a user equipment and power sharing information the user equipment is capable of supporting; and provide configuration information for power sharing carrier sets.

16 Claims, 6 Drawing Sheets

(51) Int. Cl.
*H04W 52/36* (2009.01)
*H04W 52/54* (2009.01)

(56) References Cited

U.S. PATENT DOCUMENTS

| | | | | |
|---|---|---|---|---|
| 8,014,264 | B2* | 9/2011 | Li et al. | 370/203 |
| 8,014,375 | B2* | 9/2011 | Yano et al. | 370/342 |
| 8,068,867 | B2* | 11/2011 | Chiang | 455/522 |
| 8,072,916 | B2* | 12/2011 | Dateki | 370/318 |
| 8,094,579 | B2* | 1/2012 | Olsson et al. | 370/252 |
| 2004/0235438 | A1* | 11/2004 | Quilisch | H03G 3/3047 455/127.2 |
| 2005/0085196 | A1* | 4/2005 | Amano | H04B 7/0805 455/101 |
| 2005/0135312 | A1 | 6/2005 | Montojo et al. | |
| 2008/0056427 | A1* | 3/2008 | Bristow | H03L 7/18 375/376 |
| 2008/0180171 | A1* | 7/2008 | Brobston | H03F 1/3241 330/149 |
| 2008/0293368 | A1* | 11/2008 | Desai | H04B 7/0691 455/138 |
| 2009/0154403 | A1* | 6/2009 | Niwano | 370/329 |
| 2009/0180451 | A1* | 7/2009 | Alpert | H04W 72/1215 370/338 |
| 2011/0081932 | A1* | 4/2011 | Astely | H04L 5/001 455/509 |
| 2011/0092242 | A1* | 4/2011 | Parkvall | H04L 5/0094 455/509 |
| 2012/0083288 | A1* | 4/2012 | Siomina | 455/456.1 |
| 2012/0106404 | A1* | 5/2012 | Damnjanovic | 370/279 |
| 2012/0115537 | A1* | 5/2012 | Gaal | H04W 52/146 455/522 |
| 2012/0213154 | A1* | 8/2012 | Gaal | H04B 7/0608 370/328 |
| 2012/0276916 | A1* | 11/2012 | Kazmi et al. | 455/452.1 |
| 2013/0017841 | A1* | 1/2013 | Kazmi et al. | 455/456.1 |
| 2013/0064219 | A1* | 3/2013 | Siomina et al. | 370/331 |

OTHER PUBLICATIONS

3GPP TS 36.300 V8.9.0 (Jun. 2009), titled "Network Evolved Universal Terrestrial Radio Access (E-UTRA) and Evolved Universal Terrestrial Radio Access Network, Overall description Stage 2 (Release 8)", was presented as Technical Specification, 3GPP TS 36.300, having Document No. 3GPP TS 36.300 V8.9.0 (Jun. 2009), dated Jun. 2009, pp. 01-159.*
3GPP TR 25.912 V8.0.0 (Dec. 2008), titled, Technical Report, 3rd Generation Partnership Project, Technical Specification Group Radio Access Network Feasibility study for evolved Universal Terrestrial Radio Access (UTRA) and Universal Terrestrial Radio Access Network (UTRAN)(Release 8).*
3GPP TS 25.302 V8.3.0 (Jun. 2009), titled, Technical Specification, 3rd Generation Partnership Project, Technical Specification Group Radio Access Network Services provided by the physical layer (Release 8).*
Wijting, C.; Doppler, K.; Kalliojarvi, K.; Svensson, T.; Sternad, M.; Auer, G.; Johansson, N.; Nystrom, J.; Olsson, M.; Osseiran, A.; Dottling, M.; Luo, J.; Lestable, T.; Pfletschinger, S.,"Key technologies for IMT-advanced mobile communication systems," Wireless Communications,IEEE, vol. 16, No. 3, pp. 76,85,Jun. 2009, doi: 10.1109/MWC.2009.5109467.*
3GPP TS 36.101 V8.6.0 (Jun. 2009) Technical Specification3rd Generation Partnership Project Technical Specification Group Radio Access Network Evolved Universal Terrestrial Radio Access (E-UTRA)User Equipment (UE) radio transmission and reception Release 8.*
Siemens presented at TSG-RAN Working Group 4 meeting #6 TSGR4#6(99) 361, Title, "UE maximum output power and UE power classes (TDD)", in Queens ferry, Jul. 26-29, 1999, as an Agenda Item Document for Discussion and Decision.*
Huawei presented at 3GPP TSG RAN WG1 meeting #56 R1-090817; Title, "Consideration on carrier aggregation for home eNB", in Athens, Greece, Feb 9-13, 2009, as Agenda Item: 12.1 Document for Discussion and Decision.*
Huawei presented at 3GPP TSG RAN WG1 Meeting #56 R1-090814; Title, "Component carrier structures", in Athens, Greece, Feb. 9-13, 2009, as Agenda Item: 12.1 Document for Discussion and Decision.*
3GPP R1-091780; 3GPP TSG RAN WG1 #57 Meeting; Source: Nokia Siemens Networks, Nokia; Title: PUSCH Power Control for LTE-Advanced introduced and noted as Agenda item: 15.7 @ San Francisco, USA, May 4-8, 2009 as a Document for: Discussion and Decision; pp. 01 through 05; (R1-091780, hereinafter).*
3GPP TS 36.331 V8.5.0 (Mar. 2009), titled, Technical Specification, 3rd Generation Partnership Project, Technical Specification Group Radio Access Network Evolved Universal Terrestrial Radio Access (E-UTRA) Radio Resource Control (RRC) Protocol specification (Release 8) teaches and specifies the Radio Resource Control protocol for the UE-E-UTRAN rad.*
3GPP TS 25.133 V4.13.0 (Sep. 2004); titled, 3rd Generation Partnership Project; Technical Specification Group Radio Access Network; Requirements for support of radio resource management (FDD) (Release 4).*
3GPP TS 25.321 V8.5.0 (Mar. 2009), titled, Technical Specification, 3rd Generation Partnership Project, Technical Specification Group Radio Access Network Evolved Universal Terrestrial Radio Access (E-UTRA) Radio Resource Control (RRC) Protocol specification (Release 8).*
3GPP R1-084226, titled "Uplink multiple access schemes for multiple component carriers," (R1-084226hereinafter) was published as 3GPP TSG RAN WG1 Meeting #55; R1-084226 Prague, Czech Republic, Nov. 10-14, 2008, pp. 01 through 03.*
3GPP R1-091780; 3GPP TSG RAN WG1 #57 Meeting; Source: Nokia Siemens Networks, Nokia; Title: PUSCH Power Control for LTE-Advanced introduced and noted as Agenda item: 15.7 @ San Francisco, USA, May 4-8, 2009 as a Document for: Discussion and Decision; pp. 01 through 05.*
3GPP R1-084226, titled "Uplink multiple access schemes for multiple component carriers," (R1-084226hereinafter) was published as 3GPP TSG RAN WG1 Meeting #55; R1-084226, Prague, Czech Republic, Nov. 10-14, 2008, pp. 01 through 03.*
3GPP TS 36.331 V8.5.0 (Mar. 2009), titled, Technical Specification, 3rd Generation Partnership Project, Technical Specification Group Radio Access Network Evolved Universal Terrestrial Radio Access (E-UTRA) Radio Resource Control (RRC) Protocol specification (Release 8).*
3GPP TS 25.306 V7.9.0 (Mar. 2009)Technical Specification 3rd Generation Partnership Project Technical Specification Group Radio Access Network UE Radio Access capabilities (Release 7).*
Huawei: "Consideration on Carrier Aggregation for Home eNB", 3GPP Draft; R1-090817, 3rd Generation Partnership Project (3GPP), Mobile Competence Centre; 650, Route Des Lucioles; F-06921 Sophia-Antipolis Cedex; France, no. Athens, Greece; Feb. 3, 2009.
Nokia Siemens Networks et al.: "PUSCH Power control for LTE-Advanced", 3GPP Draft; R1-091780, 3rd Generation Partnership Project (3GPP), Mobile Competence Centre; 650, Route Des Lucioles; F-06921 Sophia-Antipolis Cedex; France, no. San Francisco, USA; Apr. 28, 2009.
ZTE: "Discussion on Activation and Deactivation", 3GPP Draft; R2-103719, vol. RAN WG2, 3rd Generation Partnership Project (3GPP), Mobile Competence Centre; 650, Route Des Lucioles; F-06921 Sophia-Antipolis Cedex; France, no. Stockholm, Sweden; Jun. 22, 2010.
Huawei: "Consideration on UE RF Capability in CA", 3GPP Draft; R4-105608, vol. RAN WG4, 3rd Generation Partnership Project (3GPP), Mobile Competence Centre; 650, Route Des Lucioles; F-06921 Sophia-Antipolis Cedex; France, no. Bratislava; Jul. 1, 2010.
International Search report mailed Jan. 24, 2011. In corresponding application No. PCT/US2010/044881.
Written Opinion of the International Searching Authority mailed Jan. 24, 2011. In corresponding application No. PCT/US2010/044881.
International Publication No. WO 2011/019653 publication date Feb. 17, 2011. In corresponding application No. PCT/US2010/044881.

(56) References Cited

OTHER PUBLICATIONS

Office Action mailed on Dec. 20, 2013, in Canadian patent application No. 2,771,081.
3GPP TSG RAN WG1 #57 Meeting—R1-091780; PUSCH Power Control for LTE Advanced, Nokia Siemens Networks, Nokia, San Francisco, CA, May 4-8, 2009, 4 pages; http://www.3gpp.org/DynaReport/TDocExMtg—R1-57—27292.htm, May 4, 2009.
Office action issued in Canadian Application No. 2,771,081 on Feb. 5, 2015, 6 pages.

* cited by examiner

US 9,288,808 B2

METHOD AND APPARATUS FOR POWER SHARING CARRIER SET FOR CARRIER AGGREGATION

RELATED APPLICATIONS

The present disclosure claims priority from U.S. Provisional Application No. 61/234,023, filed Aug. 14, 2009, the entire contents of which are incorporated herein by reference.

FIELD OF THE DISCLOSURE

The present disclosure relates to carrier aggregation and in particular to scheduling related to carrier aggregation.

BACKGROUND

In various radio technologies, carrier aggregation is being considered in order to support wider transmission bandwidth for increased potential peak data rate to meet the radio technology requirements. In carrier aggregation, multiple component carriers are aggregated and they can be allocated in a subframe to a user equipment (UE). Thus, for example, each component carrier may have a bandwidth of, for example, 20 MHz and a total aggregated system bandwidth of, for example, up to 100 MHz with five component carriers. The UE may receive or transmit on multiple component carriers depending on its capabilities. Further, carrier aggregation may occur with carriers located in the same band and/or carriers located in different bands. For example, one carrier may be located at 2 GHz band and a second aggregated carrier may be located at 800 MHz band.

One radio technology in which carrier aggregation is contemplated is the Long Term Evolution-Advanced (LTE-A) architecture. However, this is not meant to be limiting to the present disclosure and other radio technologies, including HSDPA for CDMA networks may utilize similar methods and apparatus.

In order to support multiple carrier transmission in the uplink, a UE may require different transmitter architectures. One of the transmitter architecture issues is whether multiple carriers use one power amplifier or not. In some instances, a power amplifier may be shared between multiple carriers. In other instances, a power amplifier may be required for each carrier. This could, however, affect scheduling and uplink transmission.

BRIEF DESCRIPTION OF THE DRAWINGS

The present disclosure will be better understood with reference to the drawings, in which.

DETAILED DESCRIPTION OF THE DRAWINGS

Figure 1:
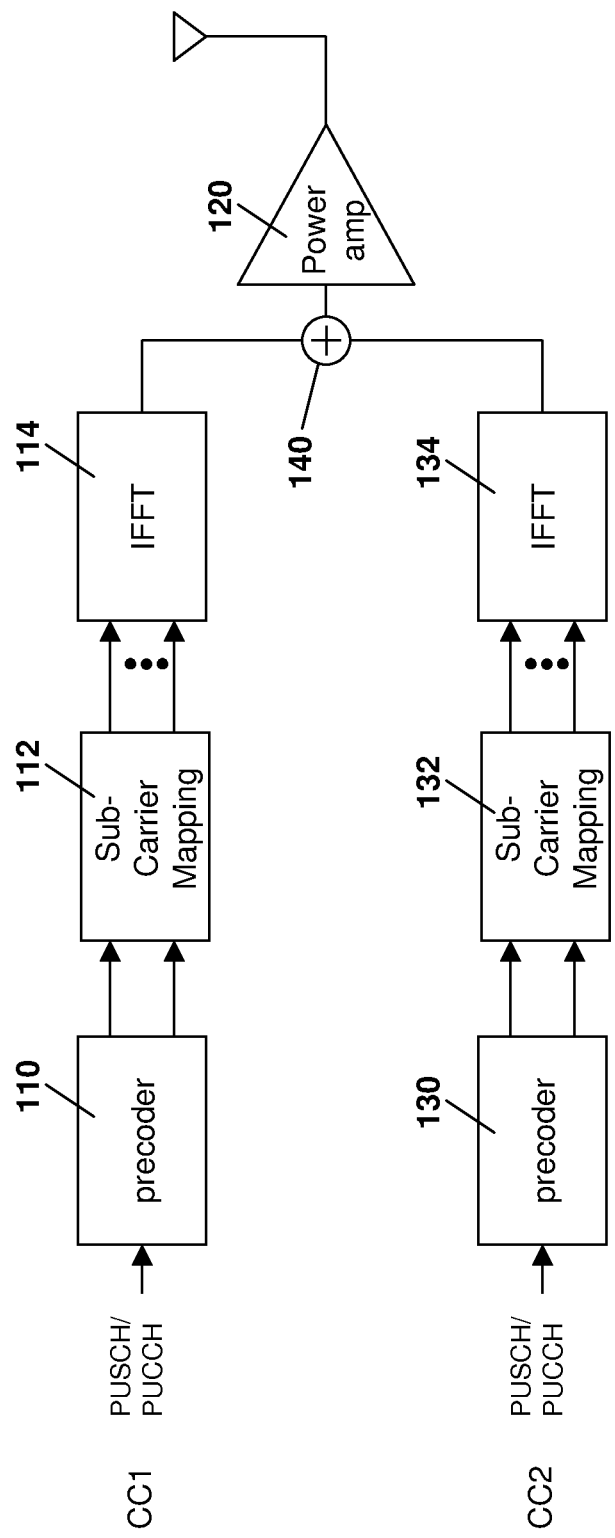
FIG. 1 is a schematic diagram showing an exemplary simplified transmitter architecture in which two component carriers utilize a single power amplifier.

To support multiple carrier transmission in the uplink, the UE may require different transmitter architectures. Reference is now made to FIG. 1. FIG. 1 shows a first transmitter architecture in which two carriers share a single power amplifier.

In particular, a first precoder 110 receives a physical uplink shared channel or physical uplink control channel (PUSCH/PUCCH). The precoder 110 performs precoding and generates the parallel signal into frequency components for subcarrier mapping, as performed in block 112. The subcarrier mapping of block 114 is then provided to an Inverse Fast Fourier Transform (IFFT) block 114, whose output can then be used to provide the signal to transmit from the UE to the E-UTRAN Node B (eNB).

The output from IFFT 114 is provided to a power amplifier 120 which is then used to amplify the signal and transmit it to the eNB.

In the embodiment of FIG. 1, blocks 110, 112 and 114 form a transmitter for a first component carrier. In a similar manner, a precoder 130, subcarrier mapping block 132 and Inverse Fast Fourier transform block 134 are used for a second component carrier.

In the example of FIG. 1, the transmitter shows two carriers sharing a single power amplifier 120. The output from IFFT 114 and IFFT 134 are added at block 140 before being provided to a power amplifier 120. Note that some other components such as the digital-to-analog conversion and up-conversion are not shown in FIG. 1.

Figure 2:
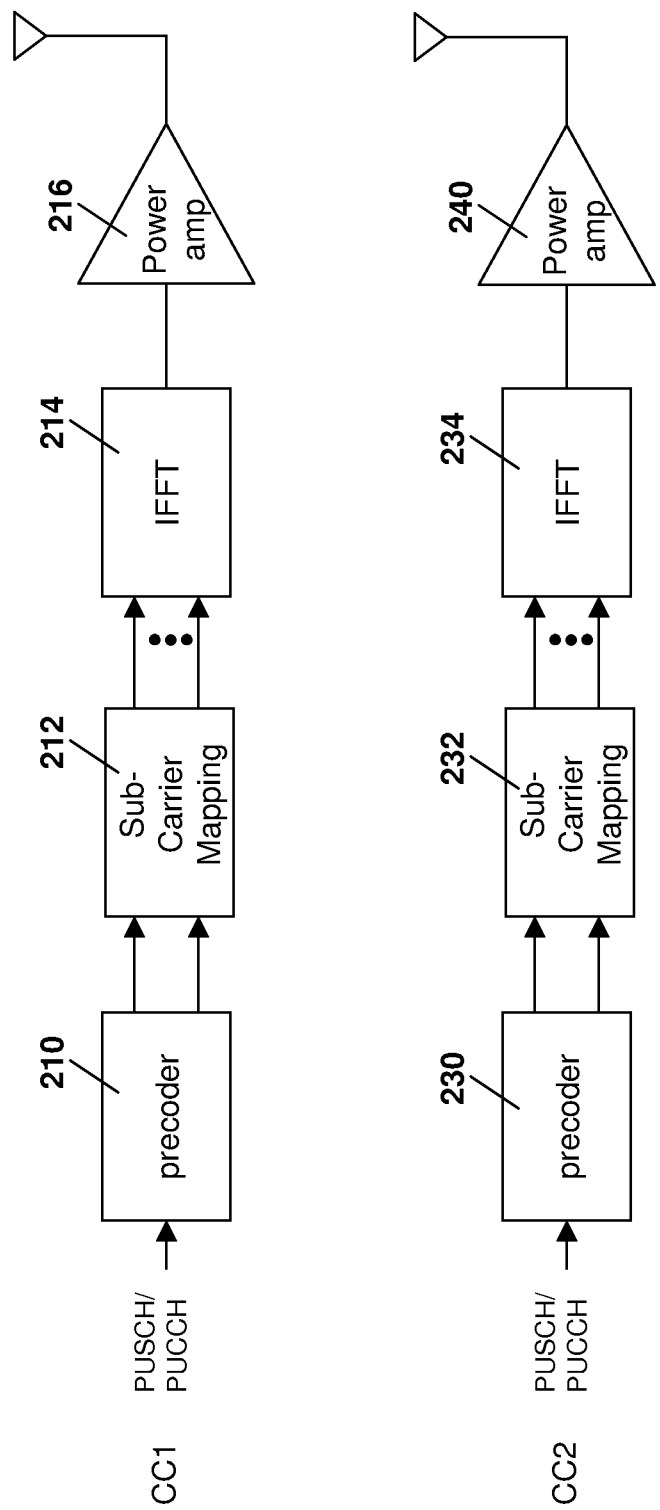
FIG. 2 is a schematic diagram showing an exemplary simplified transmitter architecture in which two component carriers each have an independent power amplifier.

In an alternative embodiment, each transmitter chain can use its own power amplifier. In this regard, reference is now made to FIG. 2. In FIG. 2, a first component carrier has a precoder 210, a subcarrier mapping block 212 and an Inverse Fast Fourier transform block 214. The output from IFFT 214 is provided to a power amplifier 216.

Similarly, a second component carrier includes a precoder 230, a subcarrier mapping block 232 and a IFFT block 234. The output from IFFT block 234 is provided to a power amplifier 240.

Having regard to FIG. 1 and FIG. 2 above, the design implementation can depend on each UE and may be dependent on the frequencies of the carriers being utilized. For example, if multiple carriers are located in the same frequency band, it may be easier to implement one power amplifier shared by multiple carriers. However, if multiple carriers are located in different frequency bands it may be easier to have different power amplifiers used for the different carriers.

If each transmission to a carrier uses a different power amplifier, current Long Term Evolution Release 8 scheduling and transmission mechanisms could be utilized because each carrier operates independently. Conversely, if multiple carriers share a single power amplifier, joint scheduling for these carriers could be applied.

Further, handling of maximum and minimum transmit power limits jointly between the carriers may also be considered when sharing a single power amplifier. For example, when two carriers share a single power amplifier, and the eNB schedules two carriers to use the full power at the same time, then a problem may arise. In particular, since the total combined power of the two carriers should not be greater then its total transmit power that can be handled by the power amplifier, the UE shall reduce the total combined power by reducing the transmit power of one of the carriers or both carriers. However, the scheduling performance on the reduced carrier could be degraded by transmitting with a lower power than what the eNB expects.

In LTE-A, the power amplifier structure may be different depending on the UE implementation and/or a deployment scenario. This is, for example, provided for in a document entitled "TP; LTE-Advanced; UE Tx characteristics", R4-091803, Motorola, which shows that both options introduced above with regard to FIGS. 1 and 2 are considered for intra-band carrier aggregation, while it is more likely to use separate power amplifiers for each band for the inter-band aggregation.

Furthermore, even though the UE has a single power amplifier for multiple carriers, it may also be possible to perform independent scheduling or to have different maximum or minimum power limits for each carrier to limit complexity. If this is the case, the operation of the carriers may be the same as the case having separate power amplifiers for each carrier.

However, in order to support efficient scheduling and uplink transmission in all possible power amplifier structures, the present disclosure provides for flexible operation related to multiple carriers and power amplifier structures.

The present disclosure provides for a power sharing carrier set to facilitate more efficient uplink transmissions for various types of transmitter structures. In one embodiment, carriers sharing the same power amplifier are included in the same power sharing carrier set whereas carriers belong to different power amplifiers are in different power sharing carrier sets. In another embodiment, it is also possible that carriers sharing the same power amplifier can be grouped into different power sharing carrier sets.

Figure 3:
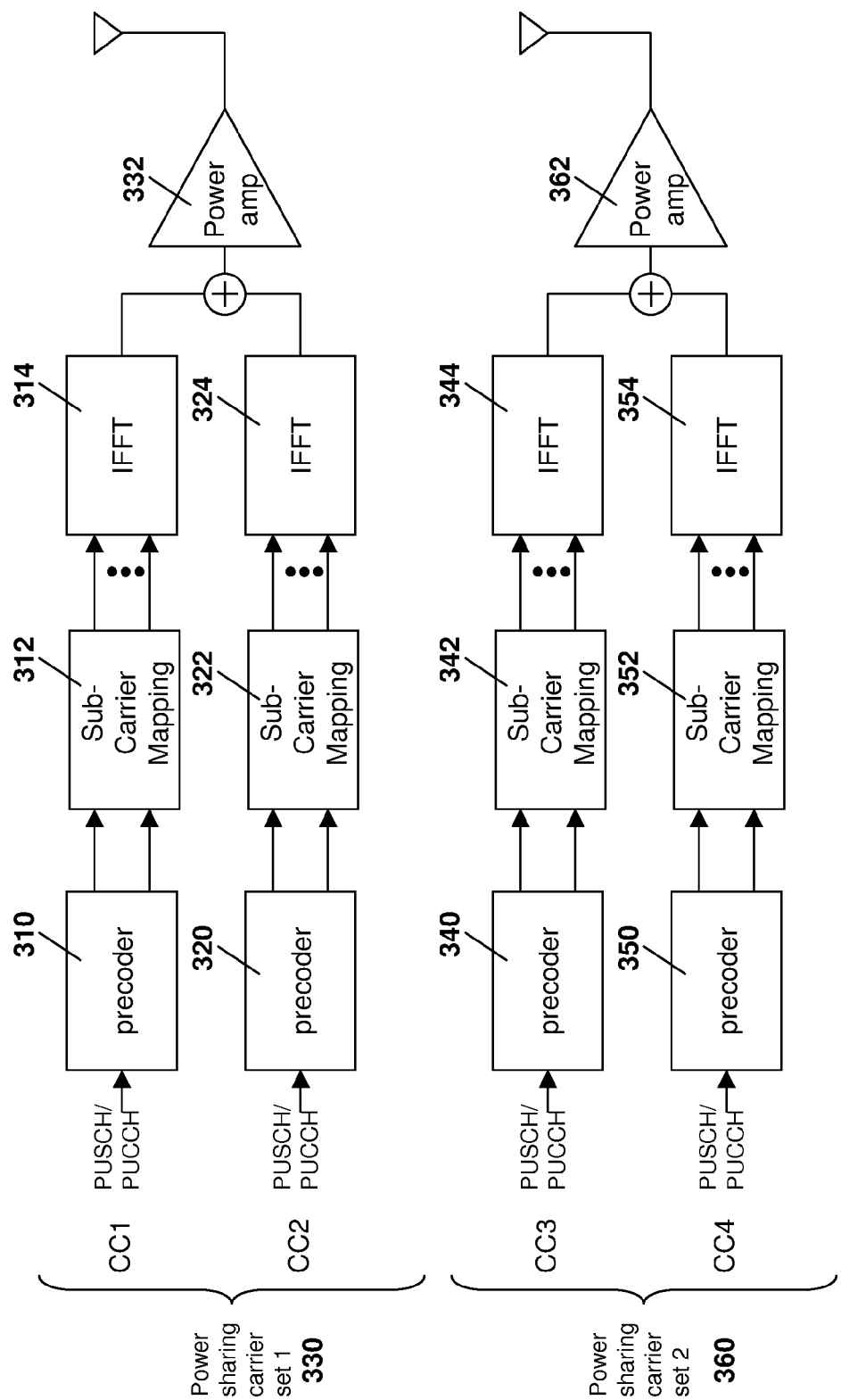
FIG. 3 is a schematic diagram showing an exemplary simplified transmitter architecture in which two power sharing carrier sets are provided.

Reference is now made to FIG. 3, which shows an example where four component carriers are configured to transmit an uplink signal. The first and second component carriers share a first power amplifier and the third and fourth component carriers share a second power amplifier. In this case, component carrier 1 and component carrier 2 are included in the power sharing carrier set 1 and component carrier 3 and component carrier 4 are included as power sharing carrier set 2.

In particular, referring to FIG. 3, a transmitter for component carrier 1 includes a precoder 310, subcarrier mapping 312 and Inverse Fast Fourier Transform block 314.

Further, a transmitter for component carrier 2 includes a precoder 320, a subcarrier mapping block 322 and an Inverse Fast Fourier Transform block 324.

FIG. 3 shows a power sharing carrier set 330, which includes component carrier 1 and component carrier 2 through the sharing of a power amplifier 332.

Also, as shown in FIG. 3, a component carrier 3 includes a precoder 340, a subcarrier mapping block 342 and Inverse Fast Fourier Transform block 344.

Further, a fourth component carrier includes a precoder 350, a subcarrier mapping block 352 and an Inverse Fast Fourier Transform block 354.

FIG. 3 also shows a power sharing carrier set 360 which includes the third component carrier and fourth component carrier through the sharing of a power amplifier 362 for the output from Inverse Fast Fourier transform block 344 and Inverse Fast Fourier Transform block 354.

The example of FIG. 3 is not meant to be limiting, but merely shows possible groupings of carriers into power sharing carrier sets. In some embodiments the component carriers may form part of a different power sharing carrier set, even if the component carriers share a power amplifier.

For example, in some embodiments each carrier can have a different power sharing carrier set. Thus, four power sharing carrier sets can be defined with regard to the example of FIG. 3. However, as will be appreciated by those in the art, the same power sharing carrier set for carriers using different power amplifiers may be difficult.

In one embodiment, a UE informs the eNB of whether a power amplifier is shared between carriers and the carriers within each of the power sharing carrier sets through signaling such as radio resource control (RRC) signaling, for example. In another embodiment, the UE informs the eNB, through signaling such as RRC signaling, of the different carrier sets and the list of carriers in each carrier set, without explicitly indicating power amplifiers are shared among different carriers. In further embodiments, the power sharing information is implicitly signaled, for example, via a UE class or other similar information. A new UE class could be defined to support LTE-A features.

When new UE classes are defined, a power amplifier structure can be included as one of the features distinguishing UE classes. For example, a 1-bit indicator could be used to indicate whether a simple power amplifier structure applies, namely, that component carriers located in the same band uses the same power amplifier while component carriers located in different bands use different power amplifiers. This may be, for example, the structure of FIG. 3.

If the UE does not signal its power sharing carrier information to an eNB, in one embodiment, the eNB may assume that the default configuration applies.

Characteristics of a Power Sharing Carrier Set

As used herein, a power sharing carrier set may have the following characteristics. A first characteristic is that only one maximum allowable transmit power is defined per power sharing carrier set. If necessary, the UE can inform the maximum allowable transmit power for each power sharing carrier set to the eNB through signaling such as RRC signaling, for example. In other embodiments, the eNB may signal the maximum allowed power to the UE for each power sharing carrier set based on a maximum supportable transmit power that a UE has previously reported.

A second characteristic may be that if the data and control signaling are transmitted in the same subframe and the Physical Uplink Shared Channel (PUSCH) for the data transmission and the Physical Uplink Control Channel (PUCCH) for control signaling are located in the same power sharing carrier set but transmitted on different component carriers, control signaling can be transmitted in the PUSCH resource when it is desired to keep the single carrier propriety such as in LTE Release 8.

Figure 4:
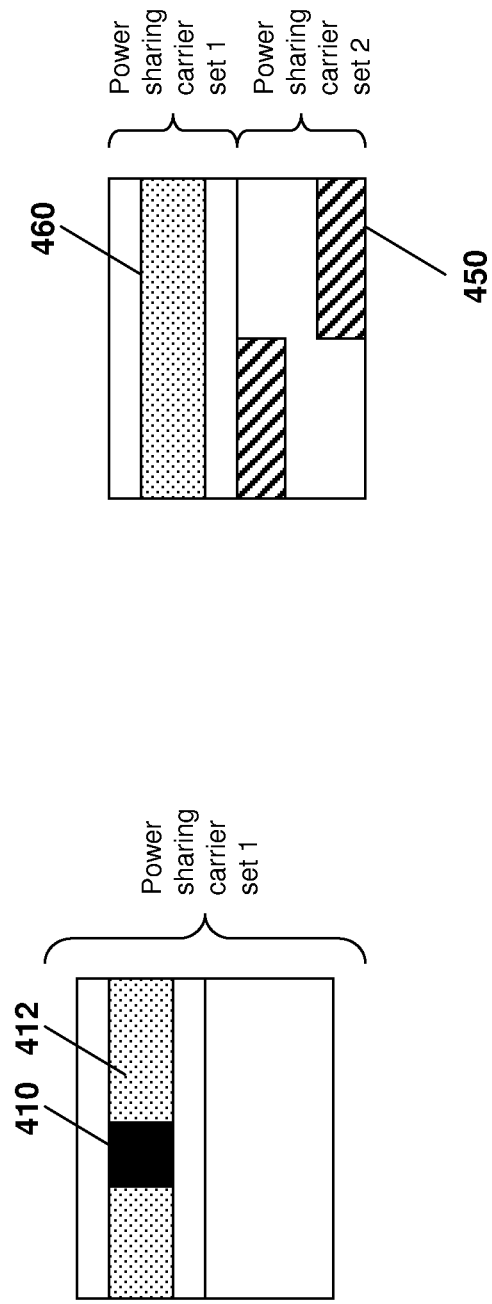
FIG. 4A is a block diagram showing the transmission of control information on a physical shared channel resource when control information is sent within the same power sharing carrier set.
FIG. 4B is a block diagram showing the transmission of control information on a physical control channel resource when control information is sent within different power sharing carrier sets.

Reference is now made to FIGS. 4A and 4B. FIG. 4A shows a power sharing carrier set in which the uplink control information is provided as part of the shared channel. FIG. 4B shows operation of a control channel and shared channel over two power sharing carrier sets.

Referring to FIG. 4A, the figure shows uplink control information 410 transmitted using a PUSCH resource 412.

Referring to FIG. 4B, the uplink control information is transmitted in the PUCCH resource 450 while the PUSCH resource 460 is transmitted on the separate power sharing carrier set.

A third characteristic of a power sharing carrier set may be a rule for setting uplink transmit power for each channel that may be similar to that defined in LTE Release 8, in which open loop power control is applied and corrected by TPC (transmission power control) commands signaled by the eNB. Parameters and TPC commands for power setting can be carrier specific or power sharing carrier set specific.

A fourth characteristic of a power sharing carrier set may be that the UE controls the total power of multiple PUSCHs and/or PUCCHs in the same power sharing carrier set so as not to exceed a maximum allowable transmit power for a particular power sharing carrier set. If the maximum transmit power is determined by the eNB, this maximum allowable transmit power could be the lower value of the maximum transmit power configured by the eNB and the maximum transmit power determined by the UE after applying a power reduction based on the actual transmit configuration such as the number of channels, modulation, or transmit bandwidth.

A fifth characteristic of a power sharing carrier set may be in case the total transmit power of the channels in a particular power sharing carrier set exceeds a maximum allowable transmit power, several approaches may be used to scale down the transmit power of the channels. These include:

a. A first approach includes the transmit power of some of the selected channels remaining the same as calculated from an open loop power control algorithm while the transmit power of the remaining channels are scaled down from the transmit power calculated from an open loop power control algorithm by the same scaling factor such that a total transmit power of all channels does not exceed the maximum allowable transmit power. Thus, for example, the transmit power of PUCCHs remains the same as that calculated from the power control algorithm while the transmit power of PUSCHs are scaled down by the same scaling factor such that the total transmit power of all channels does not exceed the maximum allowable transmit power;
 b. In a second approach, the transmit power of all channels may be scaled down by the same scaling factor such that the total transmit power of all channels does not exceed the maximum allowable transmit power;
 c. In a third approach, the relative power scaling factors across different channels are configured by the eNB. In this case, the transmit power of each channel is scaled down according to the relative scaling factors across different channels such that the total transmit power does not exceed the maximum allowable transmit power; and
 d. In a fourth approach, the transmit power of channels on different carriers could be scaled differently while ensuring that the total transmit power of a power sharing carrier set does not exceed the maximum allowable transmit power.

A sixth characteristic of a power sharing carrier set may be that the UE controls the power difference between the PUSCHs and PUCCHs in carriers within the same power sharing carrier set to be smaller than a predefined or preconfigured threshold. Limiting the power difference may, as will be appreciated by those in the art, avoid unwanted noise leakage from carriers having the higher power to carriers having the lower power. For example, the UE could reduce the power of the channel having the higher power and the amount of power difference could be configured by the eNB or could be preconfigured by the LTE specifications.

Furthermore, in one embodiment, it may be desirable to enable the eNB to allocate all of the allowable transmit power to one carrier if other carriers in the same power sharing carrier set are not scheduled. In this case, uplink power headroom could be reported per carrier or band as proposed. The power headroom can be calculated by the UE based on the maximum allowable transmit power for the power sharing carrier set or can be calculated based on a predefined reference transmit power configured by the eNB through signaling such as RRC signaling.

Configuration

To configure a power sharing carrier set by the eNB, the UE should report to the eNB its capabilities and power sharing information. Power sharing information indicates whether there exists power sharing between carriers.

Figure 5:
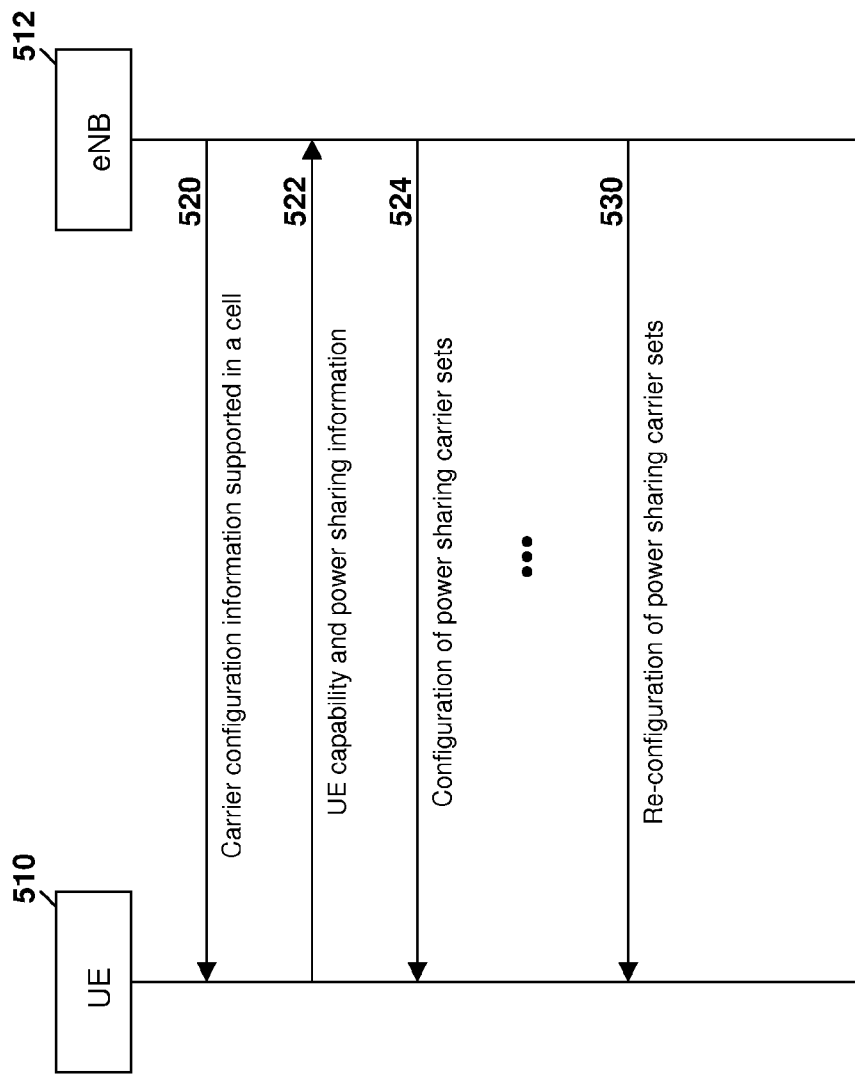
FIG. 5 is a data flow diagram showing configuration of a power sharing carrier set between a network element and a user equipment.

Reference is now made to FIG. 5. FIG. 5 shows a data flow diagram for enabling configuration of power sharing carrier sets.

In particular, in FIG. 5 a UE 510 communicates with an eNB 512.

At the outset, a message 520 from the eNB 512 to the UE 510 indicates carrier configuration information supported in the cell. Message 520 may, for example, be provided as a broadcast for System Information Broadcast (SIB). The carrier configuration may include a number of total supported downlink and uplink carriers, frequency bands of downlink and uplink carriers, pairing between uplink and downlink carriers among other factors.

After the receipt of message 520, if the UE 510 enters the connected mode, UE 510 reports its capabilities in message 522. The capabilities may include information such as which carrier or band is supported or how many carriers are supported per band. For example, a UE 510 may not be able to support all carriers. Furthermore, the UE could provide implicitly or explicitly its power sharing information for those carriers that the UE is capable of supporting.

Based on the information provided in message 522, eNB 512 sends message 524 to UE 510. In message 524, the configuration of power sharing carrier sets occurs. In particular, the eNB configures a component carrier set, in which the UE may receive Physical Downlink Shared Channel (PDSCH) or transmit PUSCH. The eNB configures power sharing carrier sets based on the component carrier set. In one embodiment, the eNB decides the power sharing carrier set based on reported power sharing information. In another embodiment, the UE could suggest/decide the power sharing carrier set.

As seen in FIG. 5, if after some time has elapsed, carrier assignment for a particular UE changes, this can be reconfigured and reconfiguration information may be sent to the UE 510 from the eNB 512 as shown in message 530.

Signaling Support

Under current LTE Release 8 specifications there is no signaling for the UE to report its power amplifier structure to an eNB. However, as pointed out above, the eNB should be aware of what kind of power amplifier structure is implemented in order to support carrier aggregation. For this reason, in one embodiment, the UE may report whether power sharing exists between carriers.

Table 1 shows an example of information field that is used to signal power sharing between carriers. Each carrier index has its own power sharing index (PS index). If the power sharing index is the same between different carriers, this means that the carriers share one power amplifier or are in one power sharing carrier set.

TABLE 1

| Carrier index | PS index |
| --- | --- |
| 1 | 000 |
| 2 | 000 |
| 3 | 000 |
| 4 | 001 |
| 5 | 010 |

In Table 1, 3-bits are used to indicate the power sharing index. If all five uplink carriers proposed under current LTE-A specifications are used, this will fit in to the 3-bit index field and in particular, the 3-bit index field could support up to eight carriers in other embodiments or radio technologies.

The carrier index is a logical index based the cell specific carrier configuration information. The eNB could signal the logical index per carrier or it could be implicitly mapped in order of carrier frequency. In the case of implicit mapping, for carriers that the UE cannot support due to UE capability limitations, the UE can delete the power sharing (PS) index of the carrier or reserve one of the PS index indices to indicate that the UE is not able to support this capability. In other embodiments, the carrier index is a logical index based on UE capability reported to the eNB to indicate how many carriers or which carriers can be supported.

In addition to Table 1 above, a maximum transmit power value could be reported per power sharing carrier set. This may be necessary if the UE does not want to support power sharing among carriers which share the same power amplifier, but rather supports dividing maximum power among each carrier. For example, in Table 1 above, carrier 4 and carrier 5 may share a single power amplifier but the UE reports different power sharing indices for them but with a smaller transmit power value. Thus, Table 2 shows an example of the maximum transmit power for each power sharing index.

TABLE 2

| PS index | Maximum Tx power [dBm] |
|---|---|
| 000 | 23 |
| 001 | 20 |
| 010 | 20 |

Furthermore, as discussed above, the use of the same power amplifier for multiple carriers is supported in intra-band carrier aggregation. Only in the case of intra-band carrier aggregation, the eNB may need to know that power sharing between carriers. Therefore, another way to signal the power amplifier structure is to indicate whether the preconfigured power amplifier structures are used without signaling the details. Reference is now made to Table 3.

TABLE 3

| 1 bit PA indicator | PA structure |
|---|---|
| 0 | Component carriers located in the same band use the same PA, while component carriers located in different bands use different PAs. |
| 1 | Each component carrier uses different PA |

In the example of Table 3, one bit of information is used to indicate the power amplifier structure. In Table 3, the 1-bit indicator could be transmitted to the eNB during a random access procedure, which is, for example, a message 3 transmission. The bit may also be transmitted during UE capability exchange procedure. The maximum transmit power is obtained by the UE class and the P-MAX signaled by the eNB.

Configuration of Power Sharing Carrier by the eNB

After the UE reports power sharing information, the eNB should configure the power sharing carrier set to the UE semi-statically. When carrier assignment to a particular UE changes, such power sharing sets could be reconfigured and signaled to the UE. The same power sharing carrier set as reported by the UE can be configured or a different power sharing carrier set can be reconfigured if the eNB does not support the joint scheduling between carriers.

Referring to Table 4 the table shows an example of the information field to signal power sharing carrier set that is signaled by the eNB. Each carrier index has a power sharing carrier set index and, similar to Table 1 above, the same power sharing carrier set index means that these carriers share a signal power amplifier, or belong to one power sharing carrier set. The carrier index is a logical index indicating a carrier in the configured component carrier set. The configured component set means carriers that the UE may schedule PDSCH/PUSCH to the UE.

TABLE 4

| Carrier index | PS carrier set index |
|---|---|
| 1 | 000 |
| 2 | 000 |
| 3 | 000 |
| 4 | 001 |
| 5 | 010 |

In a further embodiment, if the same power sharing reporting is configured as reported by the UE, the eNB can simply confirm to the UE that the configuration is the same as it is reporting. In this case, the UE determines the power sharing carrier set index with the power sharing index that the UE reports or applies a simple rule such as the increasing of order indices so that the eNB and the UE are synchronized with each other.

The eNB may signal the maximum allowed power to the UE, P-MAX per power sharing carrier set. Each power sharing carrier set may or may not have the same P-MAX. The UE transmit power should not exceed the minimum of P-MAX (in dBm), if provided, and the maximum UE power for the UE power class. An example of the P-MAX could be as follows:

TABLE 5

| PS carrier set index | P-MAX [dBm] |
|---|---|
| 000 | 23 |
| 001 | 20 |
| 010 | 20 |

Downlink Control Information Format 3

Downlink Control Information (DCI) Format 3/3A is used to transmit power control commands to multiple UEs at once. Each UE is assigned a TPC-Index using RRC signaling.

With power sharing carrier sets, each pair of UEs and power sharing carrier sets may be assigned a TPC-Index. The signaling of the TPC-Index could be accomplished by adding and indication of the power sharing (PS) carrier set index to the TPC-Index Information element in 3GPP TS 36.331, "Evolved universal terrestrial radio access (E-UTRA); Radio Resource Control (RRC)", Version 8.6.0 (2009-06), the contents of which are incorporated herein by reference.

Alternatively, the current TPC-Index assignment technique is maintained, but in DCI format 3 or 3a the PS carrier set index associated with the corresponding power control command is implicitly or explicitly signaled to the UE.

As would be appreciated by those in the art, DCI format 0 may need to include the PS carrier set index as well for the corresponding PUSCH power control command. A similar approach may be required for downlink resource related DCI formats that include PUCCH power control commands.

As will be appreciated, the above can be implemented on any UE. One exemplary UE is described below with reference to FIG. 6. This is not meant to be limiting, but is provided for illustrative purposes.

Figure 6:
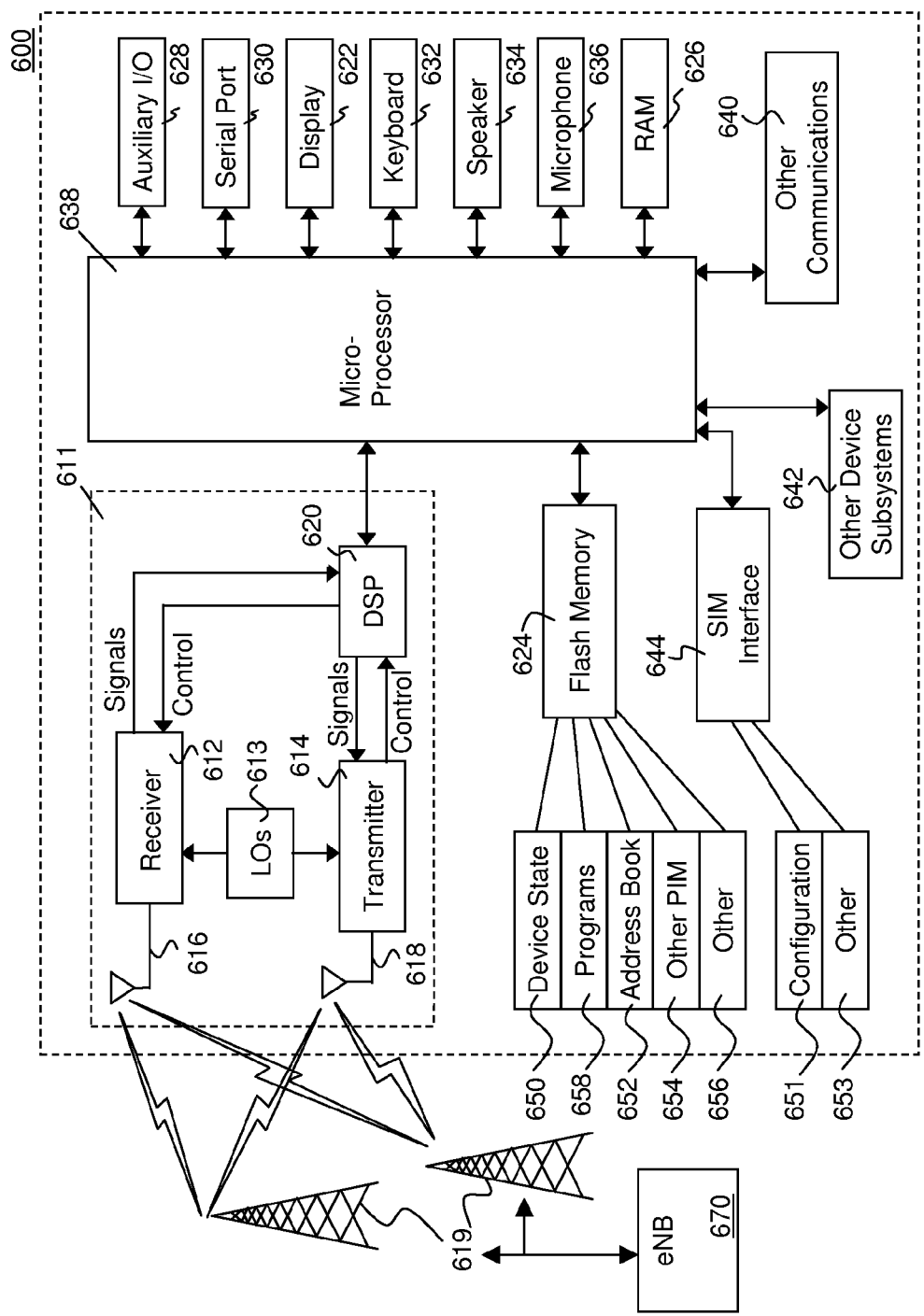
FIG. 6 is a block diagram of an exemplary mobile device capable of being used with the embodiments herein.

FIG. 6 is a block diagram illustrating a UE apt to be used with preferred embodiments of the apparatus and method of the present application. Mobile device 600 is preferably a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 600 is enabled for two-way communication, it will incorporate a communication subsystem 611, including both a receiver 612 and a transmitter 614, as well as associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. An LTE UE may require a subscriber identity module (SIM) card in order to operate on the LTE or LTE-A network. The SIM interface 644 is normally similar to a card-slot into which a SIM card can be inserted and ejected like a diskette or PCMCIA card. The SIM card may hold key configuration 651, and other information 653 such as identification, and subscriber related information.

When required network registration or activation procedures have been completed, UE 600 may send and receive communication signals over the network 619. As illustrated in FIG. 6, network 619 can consist of multiple antennas communicating with the UE. These antennas are in turn connected to an eNB 670.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

UE 600 preferably includes a microprocessor 638 which controls the overall operation of the device. Communication functions, including data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 is generally stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Microprocessor 638, in addition to its operating system functions, preferably enables execution of software applications on the UE. A predetermined set of applications that control basic operations, including at least data and voice communication applications for example, will normally be installed on UE 600 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 619. In one embodiment, the PIM data items are seamlessly integrated, synchronized and updated, via the wireless network 619, with the UE user's corresponding data items stored or associated with a host computer system. Further applications may also be loaded onto the UE 600 through the network 619, an auxiliary I/O subsystem 628, serial port 630, short-range communications subsystem 640 or any other suitable subsystem 642, and installed by a user in the RAM 626 or a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the UE 600.

In a data communication mode, a received signal such as a text message or web page download will be processed by the communication subsystem 611 and input to the microprocessor 638, which preferably further processes the received signal for element attributes for output to the display 622, or alternatively to an auxiliary I/O device 628.

A user of UE 600 may also compose data items such as email messages for example, using the keyboard 632, which is preferably a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of UE 600 is similar, except that received signals would preferably be output to a speaker 634 and signals for transmission would be generated by a microphone 636. Alternative voice or audio I/O subsystems, such as a voice message recording subsystem, may also be implemented on UE 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type UE for which synchronization with a user's desktop computer (not shown) may be desirable, but is an optional device component. Such a port 630 would enable a user to set preferences through an external device or software application and would extend the capabilities of UE 600 by providing for information or software downloads to UE 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the UE to a computer to act as a modem.

Other communications subsystems 640, such as a short-range communications subsystem, is a further component which may provide for communication between UE 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for configuring a power sharing carrier set on a user equipment having multiple component carriers, the method comprising:
providing, from the user equipment to a network element power sharing information related to at least one transmitter architecture the user equipment is capable of supporting, the power sharing information including information on whether a power amplifier is shared between carriers;
wherein the power sharing information includes a power sharing index assigned to each carrier supported between the user equipment and the network element; and
wherein the power sharing index is shared between carriers sharing a power amplifier.

2. The method of claim 1, wherein the assigning is done in an order of carrier frequency.

3. The method of claim 2, wherein the information on whether the power amplifier is shared between carriers includes an ordered sequence of power sharing indexes.

4. The method of claim 1, wherein the information on whether the power amplifier is shared between carriers further includes a maximum transmit power for each power sharing index.

5. The method of claim 4, wherein the assigning further comprises allocating a different power sharing index between two carriers sharing one physical power amplifier but having different maximum transmit powers.

6. The method of claim 1, wherein the information on whether the power amplifier is shared between carriers is sent in a radio resource control message.

7. The method of claim 1, wherein, if data and control signaling are transmitted in a same subframe and if a physical uplink shared channel and physical uplink control channel are located in a same power sharing carrier set but transmitted on different component carriers, control signaling is transmitted in the physical uplink shared channel resource.

8. The method of claim 1, further comprising controlling a total power of a plurality of physical uplink shared channels and physical uplink control channels to prevent exceeding a maximum allowable transmit power for the power sharing carrier set.

9. A user equipment comprising:
a processor; and
a communications subsystem,
wherein the processor and communications subsystem cooperate to:
provide power sharing information related to at least one transmitter architecture the user equipment is capable of supporting, the power sharing information including information on whether a power amplifier is shared between carriers;
wherein the power sharing information includes a power sharing index assigned to each carrier supported between the user equipment and the network element; and
wherein the power sharing index is shared between carriers sharing a power amplifier.

10. The user equipment of claim 9, wherein the user equipment is configured to assign in an order of carrier frequency.

11. The user equipment of claim 10, wherein the message includes an ordered sequence of power sharing indexes.

12. The user equipment of claim 9, wherein the message further includes a maximum transmit power for each power sharing index.

13. The user equipment of claim 12, wherein the user equipment is configured to assign by allocating a different power sharing index between two carriers sharing one physical power amplifier but having different maximum transmit powers.

14. The user equipment of claim 9, wherein the power sharing information is provided in a radio resource control message.

15. The user equipment of claim 9, wherein, if data and control signaling are transmitted in a same subframe and if a physical uplink shared channel and physical uplink control channel are located in a same power sharing carrier set but transmitted on different component carriers, the user equipment is configured to transmit control signaling in the physical uplink shared channel resource.

16. The user equipment of claim 9, further configured to control a total power of a plurality of physical uplink shared channels and physical uplink control channels to prevent exceeding a maximum allowable transmit power for the power sharing carrier set.

* * * * *